(12) United States Patent
Shaw

(10) Patent No.: US 9,716,596 B2
(45) Date of Patent: Jul. 25, 2017

(54) LONG TERM EVOLUTION NETWORK PROFILE BASED USAGE NOTIFICATION

(75) Inventor: Venson M. Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 811 days.

(21) Appl. No.: 13/538,057

(22) Filed: Jun. 29, 2012

(65) Prior Publication Data

US 2014/0004815 A1    Jan. 2, 2014

(51) Int. Cl.
*H04L 12/14* (2006.01)
*H04M 15/00* (2006.01)

(52) U.S. Cl.
CPC ...... *H04L 12/1407* (2013.01); *H04L 12/1435* (2013.01); *H04M 15/853* (2013.01)

(58) Field of Classification Search
CPC .... H04M 15/83; H04M 15/852; H04M 15/85; H04M 15/8353; H04M 2215/8112; H04M 2215/815; H04M 2215/8158; H04M 15/84; H04M 15/844; H04M 15/854; H04M 17/00; H04W 48/02
USPC ........................................................ 455/405
See application file for complete search history.

(56) References Cited

U.S. PATENT DOCUMENTS

| | | | |
|---|---|---|---|
| 2007/0198802 A1* | 8/2007 | Kavuri | G06F 3/0605 711/170 |
| 2012/0101952 A1* | 4/2012 | Raleigh et al. | 705/304 |
| 2012/0155296 A1* | 6/2012 | Kashanian | H04L 12/1417 370/252 |
| 2013/0231080 A1* | 9/2013 | Cheuk | H04M 15/765 455/405 |

* cited by examiner

*Primary Examiner* — Christopher M Brandt
*Assistant Examiner* — Jing Gao
(74) *Attorney, Agent, or Firm* — Baker & Hostetler LLP

(57) ABSTRACT

Notifications regarding data usage may be transmitted to mobile devices based on a threshold of data usage determined from a profile associated with the device. Upon receiving a request for service from a mobile device, a network device, such as a policy and charging rules function (PCRF) device, may determine a current bandwidth usage for the device and obtain a profile associated with the device. The network device may determine a threshold of data usage for the mobile device from the profile and determine whether the mobile device has met the threshold. If so, a notification may be transmitted to the mobile device indicating that the threshold has been met.

17 Claims, 10 Drawing Sheets

LONG TERM EVOLUTION NETWORK PROFILE BASED USAGE NOTIFICATION

TECHNICAL FIELD

The technical field generally relates to wireless communications and more specifically relates to providing notifications regarding data usage for mobile devices in long term evolution (LTE) networks based on profiles.

BACKGROUND

In current wireless networks, such as long term evolution (LTE) networks, users may be limited to an allotment of data usage for a particular time frame (e.g., X MB per month). In many networks, when a particular user reaches a threshold of data usage, they are provided a notification, which may also include an option for purchasing an additional data usage allotment or instructions for purchasing an additional data usage allotment. In current networks, the threshold used to determine when such a notification should be sent to a user is static. For example, on a particular network, each user of the network may be configured to receive a notification when they have used 80% of the respective user's data usage allotment. This configuration, while simple for network providers to implement, may not be the optimal solution for ensuring customer satisfaction.

Because the threshold in use by current networks to trigger a data usage notification is inflexible, depending on the particular user receiving the notification, the notification may be provided too early or too late for the user to make appropriate adjustments, such as arranging additional payment for an additional data usage allotment. For example, for a high data usage subscriber, a data usage notification triggered on a network-wide threshold may be received too late, as the user may quickly reach 100% consumption of their current data usage allotment and the service may be suddenly disconnected before the user is able to arrange for an increased data usage allotment. In another example, for a low data usage subscriber, a data usage notification triggered on a network-wide threshold may be received too early, as such a user may be aware that it will take a long time to reach 100% consumption of their current data usage allotment, and may ignore or forget about the warning message before arranging for an additional data usage allotment. As a result, the user may be suddenly disconnected at some point in the future because the user has not increased the user's data usage allotment due to receiving the notification too far in advance. Differences in how different users use data and the devices with which they consume data may also adversely affect how effective a notification regarding data usage may be. In any of these situations, the user's satisfaction with the service provided may be negatively impacted, which may result in a negative effect to the business interests of the network provider.

SUMMARY

A notifications regarding data usage may be transmitted to a mobile device based on a threshold of data usage determined from a profile associated with the device. A request for service from a mobile device may be transmitted to a network device, such as a policy and charging rules function (PCRF) device. A PCRF may determine a current bandwidth usage for the mobile device, in one embodiment, by communicating with a bandwidth manager. The PCRF may also obtain a profile associated with the device. Such profiles may be stored on the PCRF or elsewhere. The PCRF may determine a threshold of data usage for the mobile device from the profile by reading such a threshold directly from the profile or by using information in the profile, such as a category of data usage or device capabilities, to determine the threshold. The PCRF may determine whether the mobile device has met the threshold. If so, the PCRF may transmit, or cause a transmission of, a notification to the mobile device indicating that the threshold has been met. These and other aspects of the present disclosure are set forth in more detail below and in the figures.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1A:
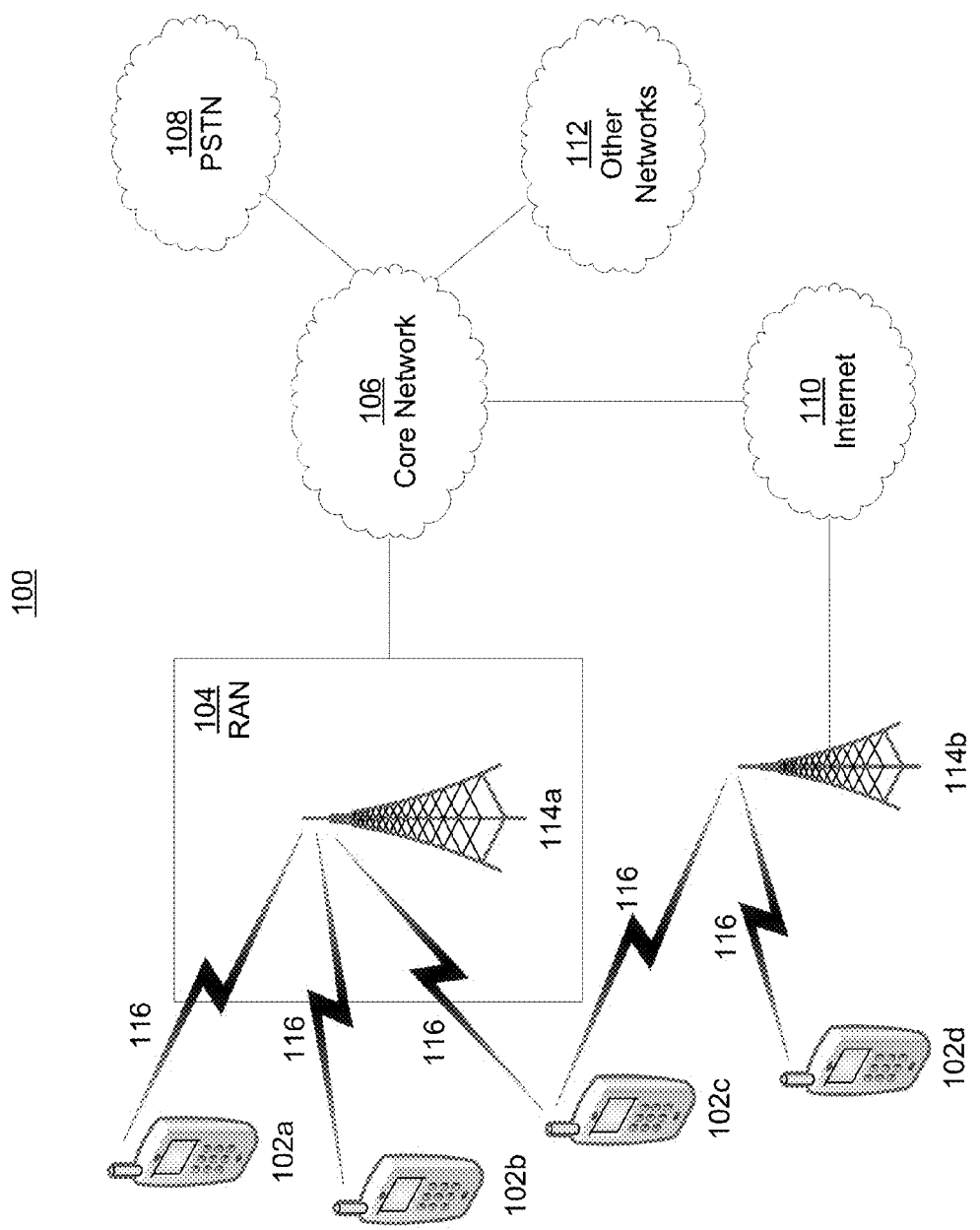
FIG. 1A is a system diagram of an example communications system in which usage notification methods and systems may be implemented.

FIG. 1A is a diagram of an example communications system 100 in which profile based usage notification systems and methods may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 1A may also be referred to herein as a network.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA) that may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
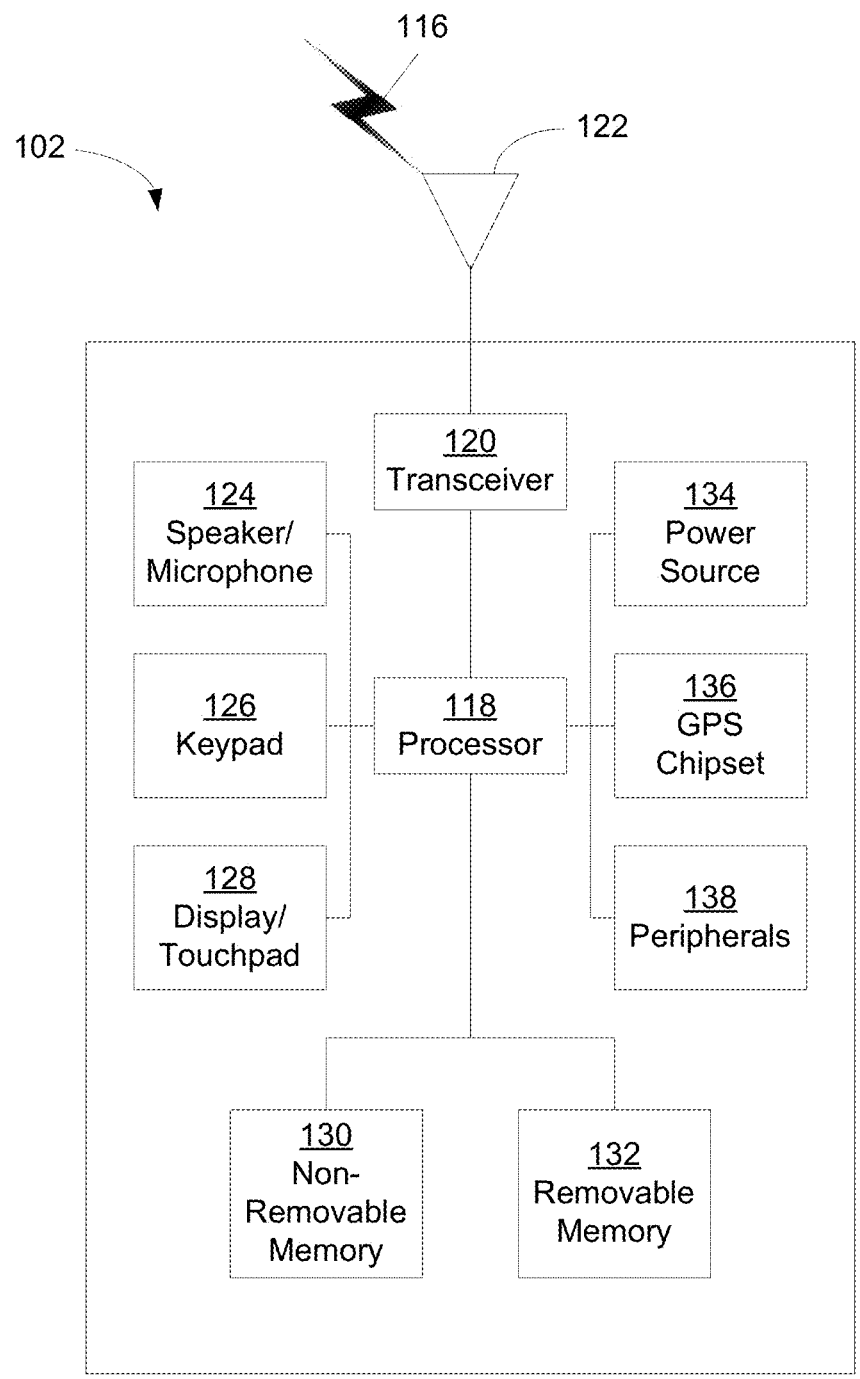
FIG. 1B is a system diagram of an example mobile device (also referred to as a wireless transmit/receive unit (WTRU) and/or as user equipment (UE)) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
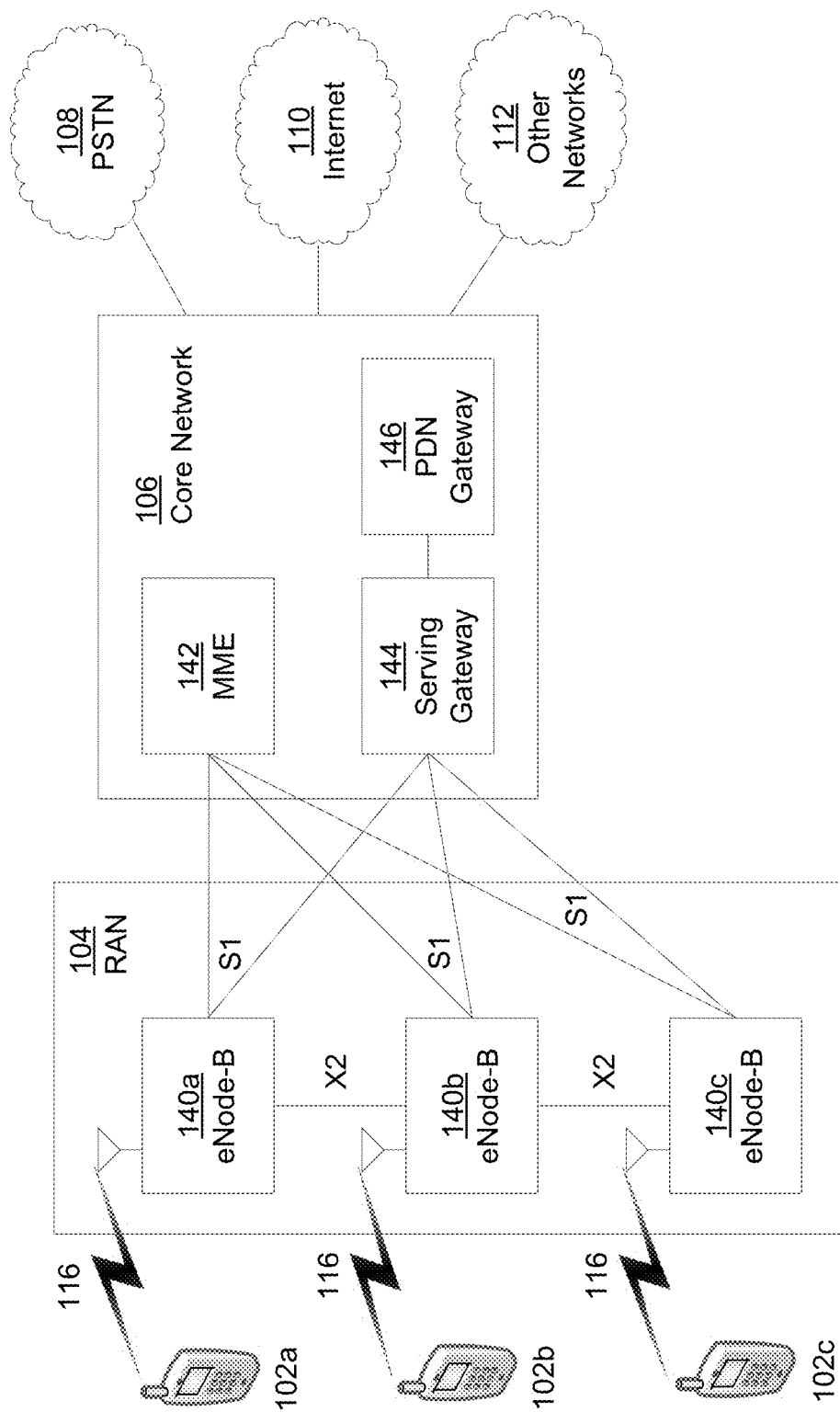
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, and 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway or entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode-Bs 140a, 140b, and 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
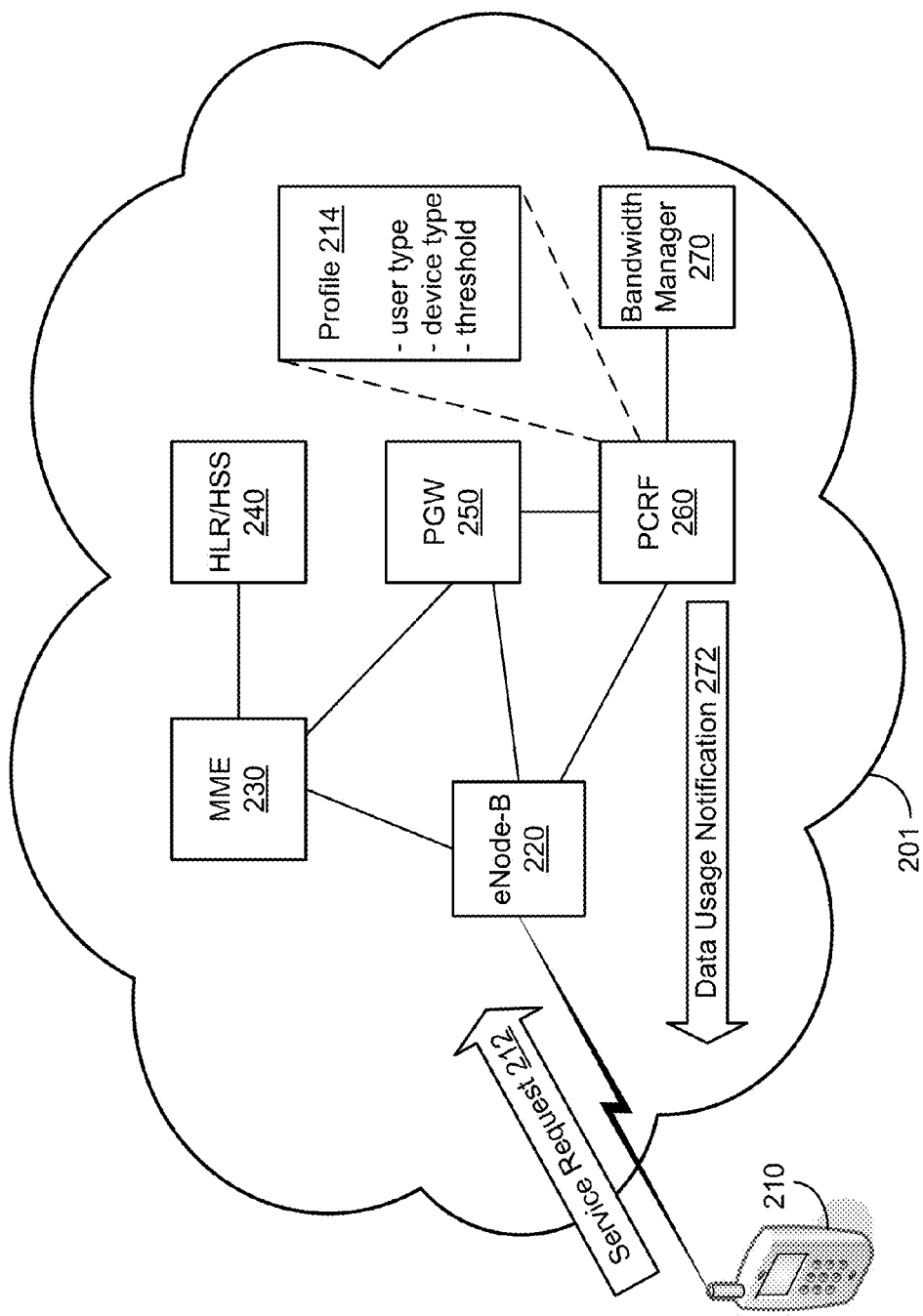
FIG. 2 illustrates a non-limiting exemplary network configuration in which usage notification methods and systems may be implemented.

FIG. 2 illustrates an exemplary network configuration and signal flow that may be used in an embodiment. Mobile device 210, in an embodiment operated by a customer of a provider of network 201, may transmit service request 212 to establish communications with network 201 to eNode-B 220. Request 212 may be a bearer request or any type of request to attach to, connect to, be admitted to, or otherwise establish communications with network 201. Mobile device 210 may be any type of wireless communications device, including a UE, a WTRU, or any other communications device as disclosed herein, or any other type of device capable of being configured to perform the functions and features of the present disclosure. Network 201 may be any type of communications network, including a wireless network, a wired network, and a combination thereof, implementing any number and type of communications protocols and technologies. eNode-B 220 may be in a radio access network (RAN) portion of network 201 and may be any type of eNode-B, or any other type of RAN device or edge device, and represents any device capable of performing the functions and activities described herein. All such embodiments are contemplated as within the scope of the present disclosure.

eNode-B 220 may forward, relay, or otherwise communicate all or a portion of service request 212 to MME 230. MME 230 may authenticate the mobile device 210, or the user thereof. In an embodiment, this may be performed by communicating with home location register/home subscriber server (HLR/HSS) 240 for authentication. HLR/HSS 240 may be any device or combination of devices that may perform any of the functions typically performed by an HLR or an HSS. Upon receiving confirmation of authentication of mobile device 210 or the user thereof, MME 230 may forward, relay, or otherwise communicate all or a portion of service request 212 to packet data network (PDN) gateway (PGW) 250, which may be responsible for establishing a bearer with mobile device 210 in order to provide the requested service.

PGW 250 may forward, relay, or otherwise communicate all or a portion of service request 212 to policy and charging rules function (PCRF) device 260. PCRF 260 may be any device, or software configured on a device, that performs policy and charging rules functions or determines and/or enforces policies in an LTE network. Responsive to receiving request 212, PCRF 260 may request and receive a data usage balance for mobile device 210 and/or a user of mobile device 210 from bandwidth manager 270, which may be any device that tracks or otherwise is configured to obtain and/or determine data usage for particular users and/or devices.

Upon receiving usage data for mobile device 210 and/or a user of mobile device 210, PCRF 260 may determine whether the usage has met or is approaching a threshold. The threshold used for this analysis may be determined or obtained from a profile associated with mobile device 210 and/or a user of mobile device 210, such as profile 214. PCRF 260 may obtain profile 214 or any related information from any device within network 201, from mobile device 210, or from any other device or system with which it may be configured to communicate. Alternatively, such profiles may be stored and maintained on PCRF 260.

A profile for a user and/or a mobile device may include an explicit indication of a threshold to be used in determining whether or not to transmit a usage notification to a mobile device. For example, a profile for a high data usage subscriber may include a threshold value of 60%, while a profile for a low data usage subscriber may include a threshold value of 80%. Alternatively, a profile for a user and/or a mobile device may include other data that may then be used by a device such as PCRF 260 to determine a threshold for use with a user and/or a mobile device. For example, a profile for a high data usage subscriber may include an indication that the user and/or device is a high data usage subscriber or device, and PCRF 260 may then determine, based on the indication, that the threshold value to be used for the user and/or device should be 60%. Similarly, a profile for a low data usage subscriber may include an indication that the user and/or device is a low data usage subscriber or device, and PCRF 260 may then determine, based on the indication, that the threshold value to be used for the user and/or device should be 80%. Any indication of a type or category of user, and any explicit indication of a threshold, may be used by any devices in network 201 to determine the correct threshold for usage notifications, and all such embodiments are contemplated as within the scope of the present disclosure.

Any type of user, type of device, or categorization thereof, may be used to determine a threshold. Similarly, any threshold may be set for any type or category of user or device. Thresholds and/or profiles may be set for individual users or subscribers, for individual devices, and/or for accounts associated with one or more devices or users. For example, a profile may be associated with a particular user, regardless of the device that user is operating. In such an embodiment, the user may be identified by information stored on a SIM card that may be moved to various devices. In another example, a profile may be associated with a device that may be identified by any of the various means of device identification disclosed herein or otherwise known to those skilled in the art. In another embodiment, a profile may be associated with one account that may be associated with multiple users and/or devices. For example, an account may be a "family plan" type of account that has associated with it several devices that are used by various members of a family. The account may have an allotment of data usage for the entire group of devices associated with the account, and may have a profile associated with it that indicates or may be used to determine a threshold to be used for providing a usage notification indicating that the allotment of data usage for the account (i.e., entire group of devices) has met the threshold. All such embodiments, and any variations thereof, are contemplated as within the scope of the present disclosure.

In an embodiment, a device, user, or account may be categorized according to the total data usage allotted to the respective device, user, or account. In such an embodiment, the associated profile may contain an indicator of this categorization and/or a corresponding threshold. For example, a device, user, or account may be categorized as a high, medium, or low data usage device, user, or account. The associated profile may include an indicator that this device, user, or account is in the high, medium, or low data usage category. This indicator may be used by a device, such as a PCRF, to determine a threshold for transmitting a data usage notification. Alternatively, or in addition, the associated profile may include the threshold that is to be used for this device, user, or account, and the threshold may correspond to the high, medium, or low data usage category as appropriate. The threshold may be obtained from the profile and used by a device, such as a PCRF, to set a threshold for transmitting a data usage notification.

Note that in any embodiment set forth herein, the category in which a device, user, or account is placed may be determined using any means. For example, the category may be determined by the type of service or plan that the user has with a network provider. Alternatively, the category may be determined by analyzing the history of data usage of the device, user, or account. In another embodiment, the category may be selected by the subscriber when or after arranging for service from provider, and may be adjusted as the subscriber sees fit. Any of these embodiments, and any other means or methods of assigning a category for any embodiment herein, are contemplated as within the scope of the present disclosure.

In another embodiment, a device, user, or account may be categorized according to a rate of data usage associated with respective device, user, or account. For example, a user may not use data services often, but when using them, using very data usage intensive services, such as downloading and watching high definition movies. In such an embodiment, the associated profile may contain an indicator of rate of data usage categorization and/or a corresponding threshold. For example, a device, user, or account may be categorized as a high, medium, or low rate of data usage device, user, or account. The associated profile may include an indicator that this device, user, or account is in the high, medium, or low rate of data usage category. This indicator may be used by a device, such as a PCRF, to determine a threshold for transmitting a data usage notification. Alternatively, or in addition, the associated profile may include the threshold that is to be used for this device, user, or account, and the threshold may correspond to the high, medium, or low rate of data usage category as appropriate. The threshold may be obtained from the profile and used by a device, such as a PCRF, to set a threshold for transmitting a data usage notification. Here again, the category in which a device, user, or account is placed may be determined using any means.

In another embodiment, a device, user, or account may be categorized according to capabilities of one or more devices associated with the user or account. For example, an account may have associated with it a high speed data capable device (e.g., 4G device). In such an embodiment, the associated profile may contain an indicator that the device associated with the profile is capable of high speed data communications and/or a corresponding threshold. Alternatively, an account may have associated with it a low speed data capable device (e.g., 2G device). In such an embodiment, the associated profile may contain an indicator that the device associated with the profile is capable only of low speed data communications and/or a corresponding threshold. The threshold or indicator may be obtained from the profile and used by a device, such as a PCRF, to set or determine a threshold for transmitting a data usage notification. Here again, the category in which a device, user, or account is placed may be determined using any means.

Figure 3:
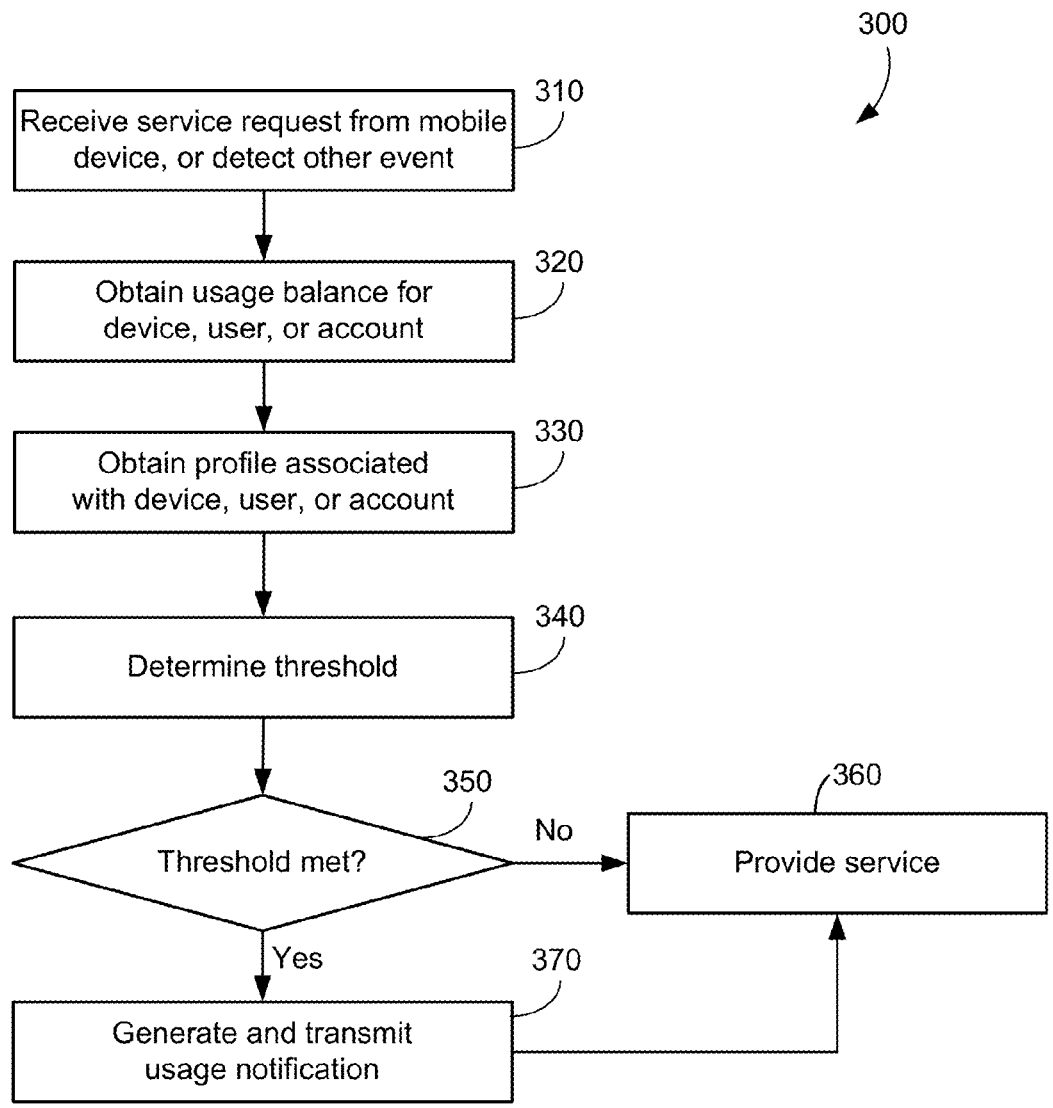
FIG. 3 illustrates a non-limiting exemplary method of implementing usage notification methods and systems.

FIG. 3 illustrates exemplary, non-limiting method 300 of implementing an embodiment as disclosed herein. Method 300, and the individual actions and functions described in method 300, may be performed by any one or more devices, including those described herein. In an embodiment, method 300 may be performed by a PCRF device, in some embodiments in conjunction with other network elements, and/or software configured and/or executing on any network element. Note that any of the functions and/or actions described in regard to any of the blocks of method 300 may be performed in any order, in isolation, with a subset of other functions and/or actions described in regard to any of the other blocks of method 300 or any other method described herein, and in combination with other functions and/or actions, including those described herein and those not set forth herein. All such embodiments are contemplated as within the scope of the present disclosure.

At block 310, a service request may be received from a mobile device. In an embodiment, this request may be received at a PCRF via an eNode-B, MME, and/or P-GW. The service request may be a request to establish a bearer to provide any type of service, or any other request for network resources. At block 320, a usage balance may be obtained for the user, device, or account associated with the request. The usage balance may be obtained by, for example, a PCRF from a bandwidth manager or any other device that maintains or is configured to obtain such information.

At block 330 a profile associated with the device, user, or account associated with the service request may be obtained. This may be performed by sending a request from a device such as a PCRF to another device for profile data and receiving profile data at the PCRF, or a PCRF may simply pull profile data from its own data storage device or memory. At block 340, based on the profile, a data usage notification threshold may be determined. As discussed in more detail herein, the threshold may be obtained directly from the profile that may include an explicit indicator of the threshold, or the threshold may be determined based on other data in the profile, such as a category if data usage or device capabilities indicated in the profile.

At block 350, a determination may be made as to whether the threshold has been met. If not, service may be provided at block 360 without transmitting a data usage notification to the requesting device. If the threshold has been met, at block 370 a data usage notification may be generated and sent to the requesting device. The data notification may be generated directly by a device that determined that a threshold has been met, such as a PCRF, or at a separate device in response to receiving an indication that a threshold has been met. The data usage notification may include any type of information, including the threshold that has been met, a percentage of and/or total data usage compared to a data usage allotment, instructions on requesting additional data usage allotments, etc. Note that in some embodiments, a data usage notification may be sent to another device instead of, or in addition to, the device that transmitted the service request. For example, in a family plan, one particular device may be configured to receive such notifications even where the triggering service request is transmitted from another device on the plan. Alternatively, data usage notifications may be sent to an email address configured or provided by the subscriber regardless of whether the email is accessible on the device that triggered the notification. Data usage notification may take any form, including a text message, an SMS message, an MMS message, a chat message, an email, an audio message, and a visual voicemail message. Any other means or methods of providing the data usage notification are contemplated as within the scope of the present disclosure. At block 360, the service requested may be provided to the requesting device.

In an alternative embodiment, a check of whether the device, user, or account has met a threshold determined from an associated profile may be performed at other points beyond, or instead of, upon receipt of a service request. For example, at block 310, rather than receiving a service request, any other event that may trigger a comparison of current data usage to a threshold may occur. Such events may be any event detectable on a wireless network, such as detecting the presence of a device on the network, transmitting a packet to a device, receiving a packet from a device, detecting keepalive traffic, etc. Thus, in an embodiment, data usage may be monitored virtually continuously, and notifications provided almost instantaneously upon a user, device, or account reaching a threshold determined from a profile for that user, device, or account.

The usage notification methods and systems described above assist in providing improved customer service by providing such notifications based on profiles that reflect actual user, device, or account characteristics rather than using static thresholds that are applied to all users, devices, or accounts regardless of the type or characteristics of such users, devices, or accounts. By implementing the present disclosure, the user experience may be improved by providing a customer an appropriate data usage notification at the appropriate time rather than sending a notification that may not be useful, and may even be counterproductive, to a customer. Set forth below are further exemplary systems, devices, and components in which aspects of the disclosed usage notification methods and systems may be implemented.

Figure 4:
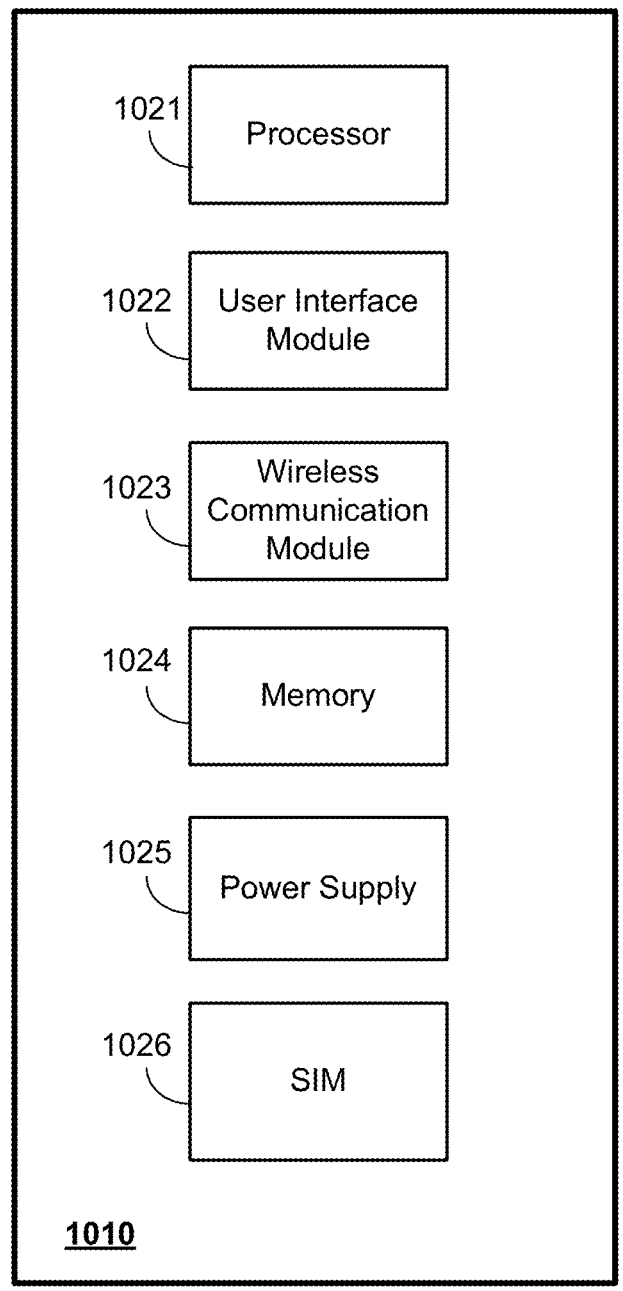
FIG. 4 is a block diagram of a non-limiting exemplary mobile device in which usage notification methods and systems may be implemented.

FIG. 4 illustrates an example wireless device 1010 that may be used in connection with an embodiment. References will also be made to other figures of the present disclosure as appropriate. For example, mobile devices 102 and 210 may be wireless devices of the type described in regard to FIG. 4, and may have some, all, or none of the components and modules described in regard to FIG. 4. It will be appreciated that the components and modules of wireless device 1010 illustrated in FIG. 4 are illustrative, and that any number and type of components and/or modules may be present in wireless device 1010. In addition, the functions performed by any or all of the components and modules illustrated in FIG. 4 may be performed by any number of physical components. Thus, it is possible that in some embodiments the functionality of more than one component and/or module illustrated in FIG. 4 may be performed by any number or types of hardware and/or software.

Processor 1021 may be any type of circuitry that performs operations on behalf of wireless device 1010. In one embodiment, processor 1021 executes software (i.e., computer-readable instructions stored on a tangible computer-readable medium) that may include functionality related to usage notification methods and systems, for example. User interface module 1022 may be any type or combination of hardware and/or software that enables a user to operate and interact with wireless device 1010, and, in one embodiment, to interact with a system or software enabling the user to place, request, and/or receive calls, text communications of any type, voicemail, voicemail notifications, voicemail content and/or data, charging and/or billing data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware and/or software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 5:
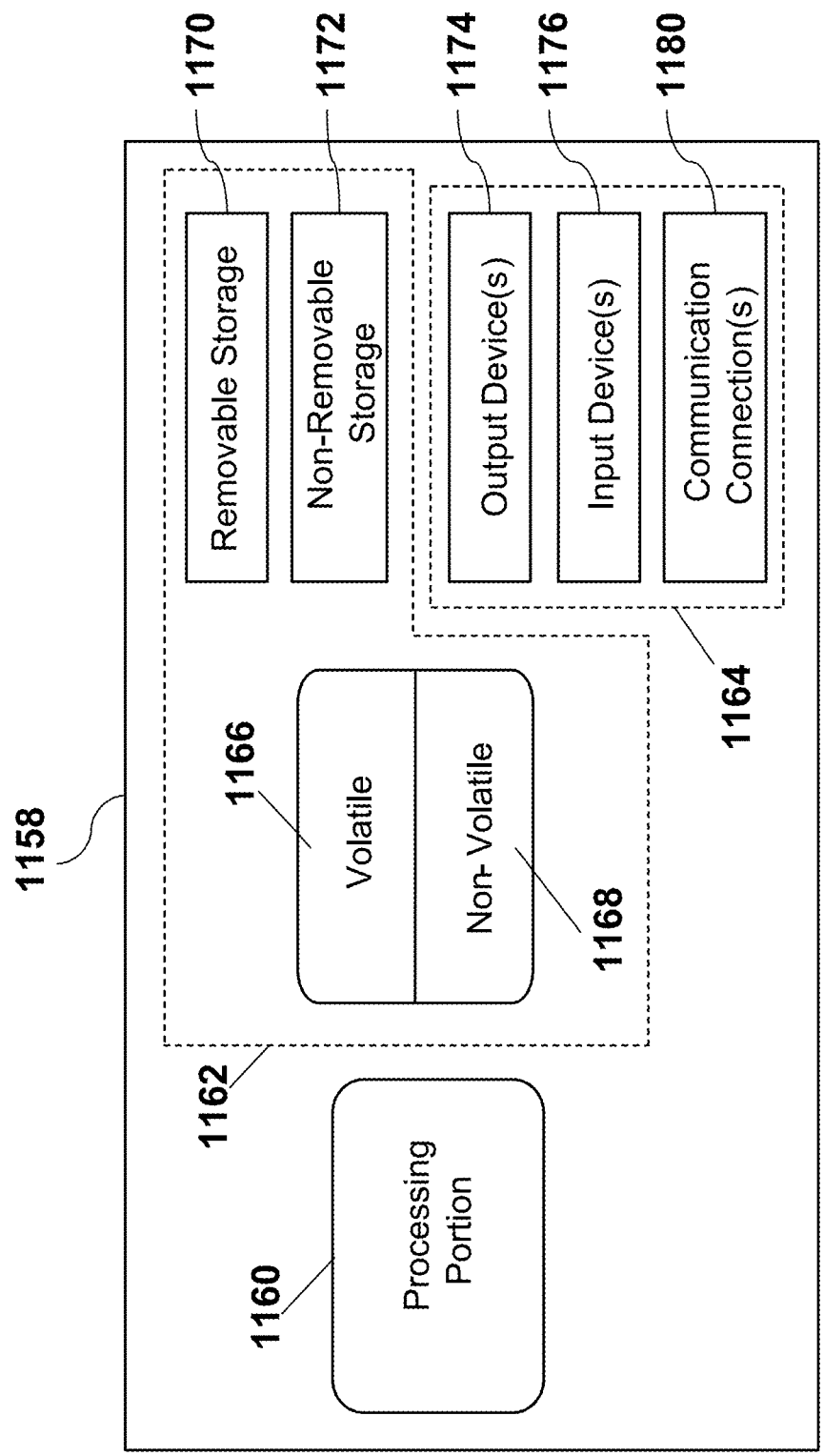
FIG. 5 is a block diagram of a non-limiting exemplary processor in which usage notification methods and systems may be implemented.

FIG. 5 is a block diagram of an example processor 1158 which may be employed in any of the embodiments described herein, including as one or more components of mobile devices 102 and 210, as one or more components of network equipment such as eNode-B 220, MME 230, PDN gateway 250, HLR/HSS 240, PCRF device 260, bandwidth manager 270, any other component of networks 106, 108,

110, 112, and 201, and/or any related equipment, and/or as one or more components of any third party system or subsystem that may implement any portion of the subject matter described herein. It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 5, the processor 1158 comprises a processing portion 1160, a memory portion 1162, and an input/output portion 1164. The processing portion 1160, memory portion 1162, and input/output portion 1164 are coupled together (coupling not shown in FIG. 5) to allow communications between these portions. The input/output portion 1164 is capable of providing and/or receiving components, commands, and/or instructions, utilized to, for example, transmit and/or receive configuration data, transmit and receive device condition data, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing usage notifications, profiles, thresholds, APNs, MNCs, MCCs, service requests, radio resource requests, QoS and/or APN parameters, software for usage notification, device and link status, condition, and congestion data, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may be tangible storage media that may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 1158. Any such computer storage media may be part of the processor 1158.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein may include both storage media and communication media. The processor 1158 also may have input device(s) 1176 such as keyboard, keypad, mouse, pen, voice input device, touch input device, etc. Output device(s) 1174 such as a display, speakers, printer, etc. also may be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how usage notification methods and systems may be implemented with stationary and non-stationary network structures and architectures in order to provide data usage notifications to users of a network. It will be appreciated, however, that usage notification methods and systems as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), LTE-Advanced. etc., as well as to other network services that become available in time. In this regard, usage notification methods and systems may be implemented independently of the method of data transport and does not depend on any particular network architecture or underlying protocols.

Figure 6:
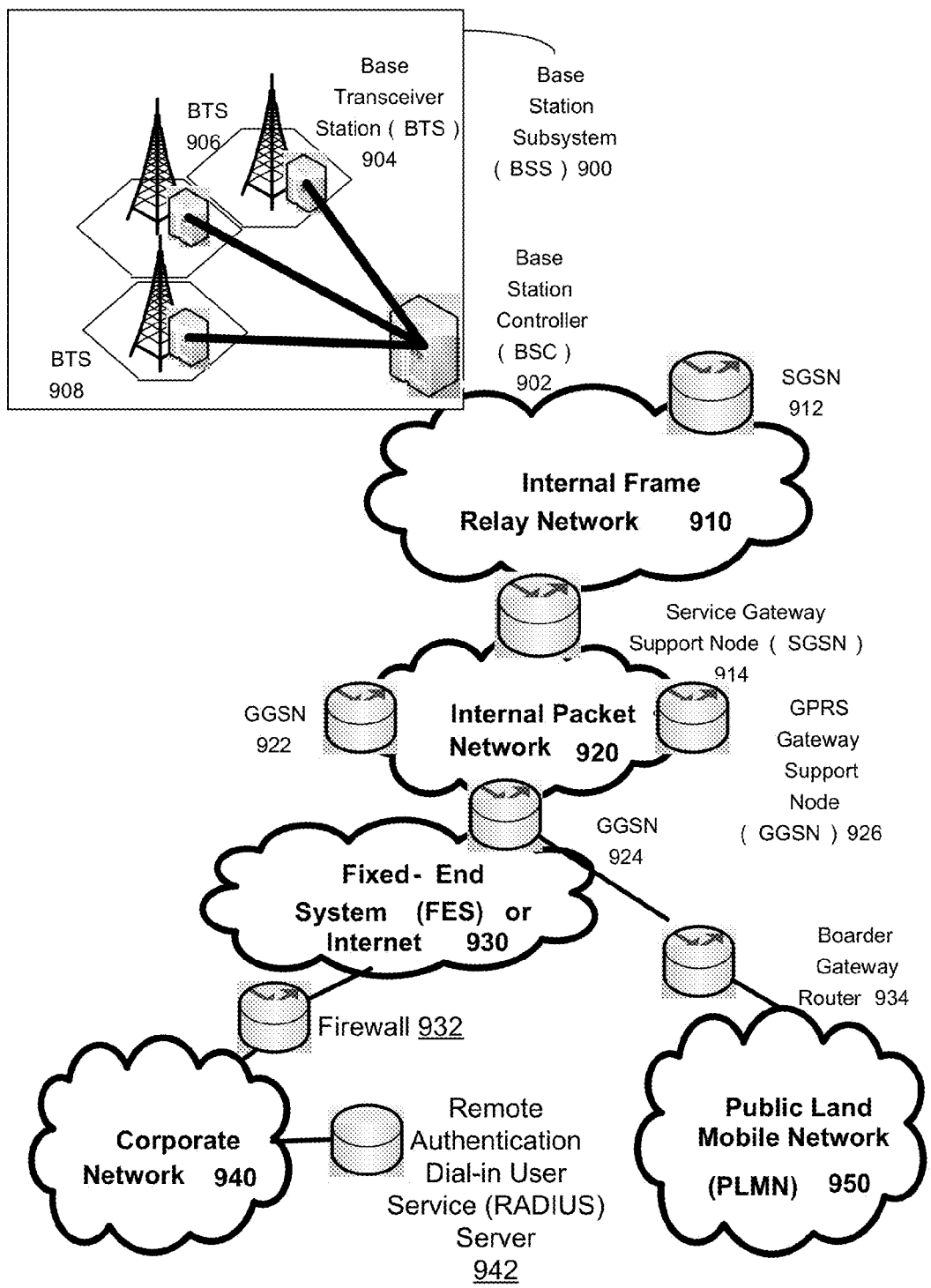
FIG. 6 is a block diagram of a non-limiting exemplary packet-based mobile cellular network environment, such as a GPRS network, in which usage notification methods and systems may be implemented.

FIG. 6 depicts an overall block diagram of an exemplary packet-based mobile cellular network environment, such as a GPRS network, in which usage notification systems and methods such as those described herein may be practiced. In an example configuration, any RAN as described herein may be encompassed by or interact with the network environment depicted in FIG. 6. Similarly, mobile devices 102 and 210 may communicate or interact with a network environment such as that depicted in FIG. 6. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 102 and 210) become connected to the wireless network. In exemplary fashion, the packet traffic originating from user devices (e.g., mobile devices 102 and 210) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc., may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there may be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 7:
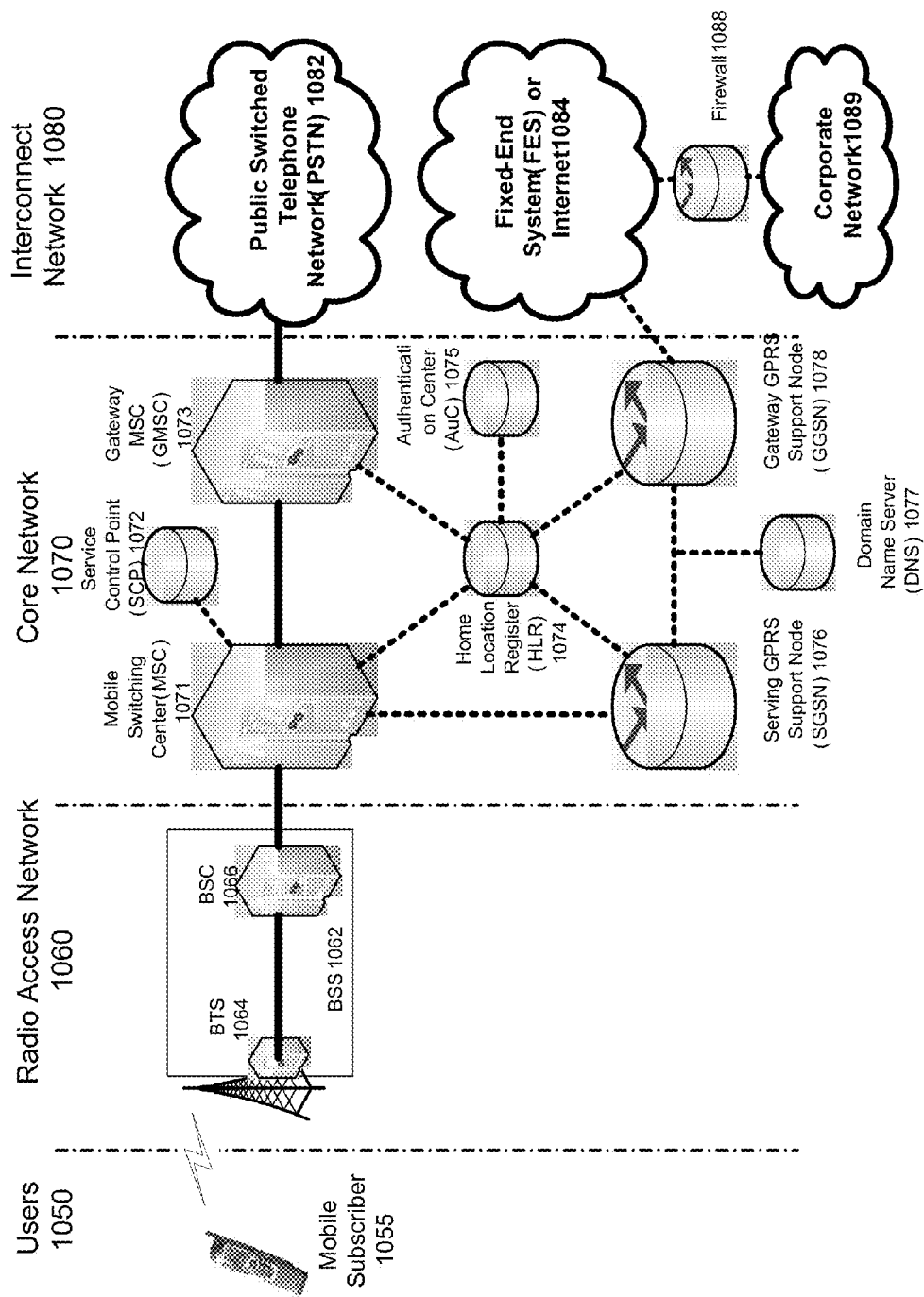
FIG. 7 illustrates a non-limiting exemplary architecture of a typical GPRS network, segmented into four groups, in which usage notification methods and systems may be implemented.

FIG. 7 illustrates an architecture of a typical GPRS network segmented into four groups: users 1050, radio access network 1060, core network 1070, and interconnect network 1080. Users 1050 may comprise a plurality of end users (although only mobile subscriber 1055 is shown in FIG. 7). In an example embodiment, the device depicted as mobile subscriber 1055 may comprise any of mobile devices 102 and 210. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 7, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some embodiments, HLR/HSS 240 may be a device such as HLR 1074. HLR 1074 may store static information about the subscribers such as the International Mobile Subscriber Identity (IMSI), APN profiles, profiles as disclosed herein, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 102 and 210, used by an end user of a mobile cellular service or a wireless provider. When a mobile subscriber turns on his or her mobile device, the mobile device may go through an attach process by which the mobile device attaches to an SGSN of the GPRS network. In FIG. 7, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of usage notification methods and systems such as those described herein may include, but are not limited to, Gateway GPRS Support Node tables, Fixed End System router tables, firewall systems, VPN tunnels, and any number of other network elements as required by the particular digital network.

Figure 8:
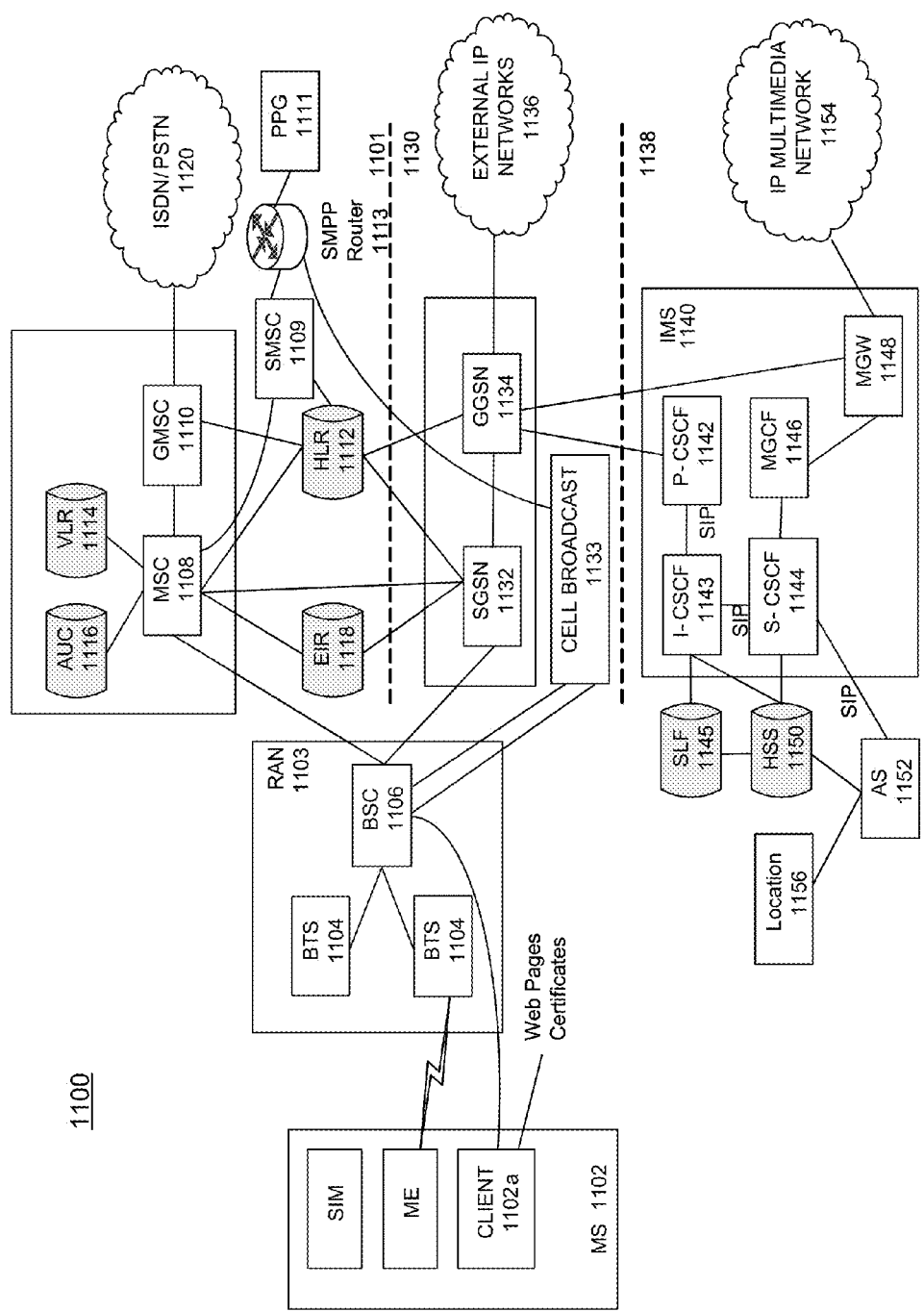
FIG. 8 illustrates a non-limiting alternate block diagram of an exemplary GSM/GPRS/IP multimedia network architecture in which usage notification methods and systems may be implemented.

FIG. 8 illustrates another exemplary block diagram view of a GSM/GPRS/IP multimedia network architecture 1100 in which the systems and methods for usage notification methods and systems such as those described herein may be incorporated. As illustrated, architecture 1100 of FIG. 8 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., mobile devices 102 and 210) that is used by mobile subscribers, in one embodiment with a Subscriber identity Module (SIM). The SIM may include an International Mobile Subscriber Identity (IMSI), which may be a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS may then activate a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

While example embodiments of usage notification methods and systems have been described in connection with various communications devices and computing devices and processors, the underlying concepts can be applied to any communications or computing device, processor, or system capable of implementing the usage notification methods and systems described. The various techniques described herein may be implemented in connection with hardware or software or, where appropriate, with a combination of both. Thus, the methods and apparatuses for usage notification, or certain aspects or portions thereof, can take the form of program code (i.e., instructions) embodied in tangible and/or other media that is not a signal (i.e., not a transient signal per se), such as floppy diskettes, CD-ROMs, hard drives, or any other machine-readable storage medium, wherein, when the program code is loaded into and executed by a machine, such as a computer, the machine becomes an apparatus for usage notification. In the case of program code execution on programmable computers, the computing device may include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for usage notification may also be practiced via communications embodied in the form of program code that may be transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, or the like, the machine becomes an apparatus for usage notification. When implemented on a general-purpose processor, the program code combines with the processor to provide a unique apparatus that operates to invoke the functionality of usage notification as described herein. Additionally, any storage techniques used in connection with a usage notification system may be a combination of hardware and software.

While usage notification methods and systems have been described in connection with the various embodiments of the various figures, it is to be understood that other similar embodiments may be used or modifications and additions may be made to the described embodiments for performing the same function of usage notification without deviating therefrom. For example, one skilled in the art will recognize usage notification as described in the present application may apply to any environment, whether wired or wireless, and may be applied to any number of such devices connected via a communications network and interacting across the network. Therefore, usage notification methods and systems should not be limited to any single embodiment, but rather should be construed in breadth and scope in accordance with the appended claims.

What is claimed is:

1. A method comprising:
   receiving, from a mobile device at a network device configured in a long term evolution network, a request for service; and
   responsive to receiving the request for service:
      determining, at the network device, a data usage balance for a categorized account associated with the mobile device, wherein the categorized account is categorized based on a rate of data usage and includes a categorization of a high rate of data usage, a medium rate of data usage and a low rate of data usage, and includes a categorization of a capability of the mobile device;
      determining, at the network device, a data usage profile associated with the mobile device or a user of the mobile device for the categorized account wherein the data usage profile has an indicator of a category of the categorized account and a data usage threshold including a first threshold associated with the high rate of data usage, a second threshold associated with the medium rate of data usage, and a third threshold associated with the low rate of data usage;
      determining, at the network device based on the data usage profile, the first threshold, the second threshold and the third threshold;
      determining, at the network device, whether to transmit a data usage notification to the mobile device based on a comparison of the data usage balance, the rate of data usage, the capability of the mobile devices and the data usage threshold associated with the rate of data usage; and
      when it is determined that the data usage notification should be transmitted, transmitting the data usage notification to the mobile device.

2. The method of claim 1, wherein determining the data usage balance comprises transmitting a request for the data usage balance to a bandwidth manager and receiving the data usage balance from the bandwidth manager.

3. The method of claim 1, wherein determining the data usage threshold based on the data usage profile comprises determining the category of the account based on the data usage profile, and determining the data usage threshold based on the category of the account.

4. The method of claim 1, further comprising determining that the data usage balance is less than the data usage threshold.

5. The method of claim 1, further comprising determining that the data usage balance is equal to or greater than the data usage threshold.

6. The method of claim 5, further comprising transmitting a notification intended for the mobile device comprising an indication that that the data usage balance is equal to or greater than the data usage threshold.

7. A network device configured in a long term evolution network comprising:
   a transceiver;
   a memory comprising instructions; and
   a processor, wherein the processor, when executing the instructions, performs operations comprising:
      receiving a request for service from a mobile device; and
      responsive to receiving the request for service:
      determining a data usage balance for a categorized account associated with the mobile device, wherein the categorized account is categorized based on a rate of data usage and includes a categorization of a high rate of data usage, a medium rate of data usage and a low rate of data usage, and includes a categorization of a capability of the mobile device;
      determining a data usage profile associated with the mobile device or a user of the mobile device for the categorized account wherein the data usage profile has an indicator of a category of the categorized account and a data usage threshold including a first threshold associated with the high rate of data usage, a second threshold associated with the medium rate of data usage, and a third threshold associated with the low rate of data usage;
      determining, based on the data usage profile, the first threshold, the second threshold and the third threshold;
      determining whether to transmit a data usage notification to the mobile device based on a comparison of the data usage balance, the rate of data usage, the capability of the mobile devices and the data usage threshold associated with the rate of data usage; and
      when it is determined that the data usage notification should be transmitted, transmitting the data usage notification to the mobile device.

8. The network device of claim 7, wherein the operation of determining the data usage balance comprises transmitting a request for the data usage balance to a bandwidth manager and receiving the data usage balance from the bandwidth manager.

9. The network device of claim 7, wherein the operation of determining the data usage threshold based on the data usage profile comprises determining a category of the account based on the data usage profile, and determining the data usage threshold based on the category of the account.

10. The network device of claim 7, wherein the operations further comprise determining that the data usage balance is less than the data usage threshold.

11. The network device of claim 7, wherein the operations further comprise determining that the data usage balance is equal to or greater than the data usage threshold.

12. The network device of claim 11, wherein the operations further comprise transmitting a notification intended for the mobile device comprising an indication that that the data usage balance is equal to or greater than the data usage threshold.

13. A non-transitory computer-readable storage medium comprising computer-executable instructions, which when executed by a processor, cause the processor to perform operations comprising:

receiving a request for service from a mobile device; and
responsive to receiving the request for service:
determining a data usage balance for a categorized account associated with the mobile device, wherein the categorized account is categorized based on a rate of data usage and includes a categorization of a high rate of data usage, a medium rate of data usage and a low rate of data usage, and includes a categorization of a capability of the mobile device;
determining a data usage profile associated with the mobile device or a user of the mobile device for the categorized account wherein the data usage profile has an indicator of a category of the categorized account and a data usage threshold including a first threshold associated with the high rate of data usage, a second threshold associated with medium rate of data usage, and a third threshold associated with the low rate of data usage;
determining, based on the data usage profile, the first threshold, the second threshold and the third threshold;
determining whether to transmit a data usage notification to the mobile device based on a comparison of the data usage balance, the rate of data usage, the capability of the mobile device and the data usage threshold associated with the rate of data usage; and
when it is determined that the data usage notification should be transmitted, transmitting the data usage notification to the mobile device.

14. The non-transitory computer-readable storage medium of claim 13, wherein the operation of determining the data usage balance comprises transmitting a request for the data usage balance to a bandwidth manager and receiving the data usage balance from the bandwidth manager.

15. The non-transitory computer-readable storage medium of claim 13, wherein the operation of determining the data usage threshold based on the data usage profile comprises determining a category of the account based on the data usage profile, and determining the data usage threshold based on the category of the account.

16. The non-transitory computer-readable storage medium of claim 13, wherein the operations further comprise determining that the data usage balance is less than the data usage threshold.

17. The non-transitory computer-readable storage medium of claim 13, wherein the operations further comprise determining that the data usage balance is equal to or greater than the data usage threshold.

* * * * *